H. HALDORSEN & K. H. SEEM.
WRENCH.
APPLICATION FILED MAY 1, 1908.
904,257.
Patented Nov. 17, 1908.
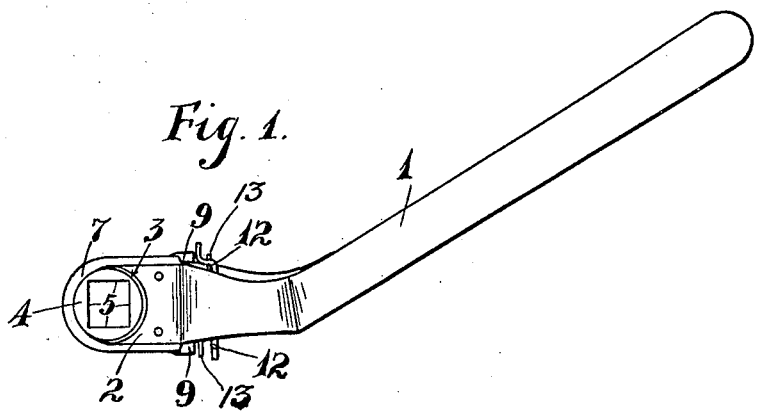
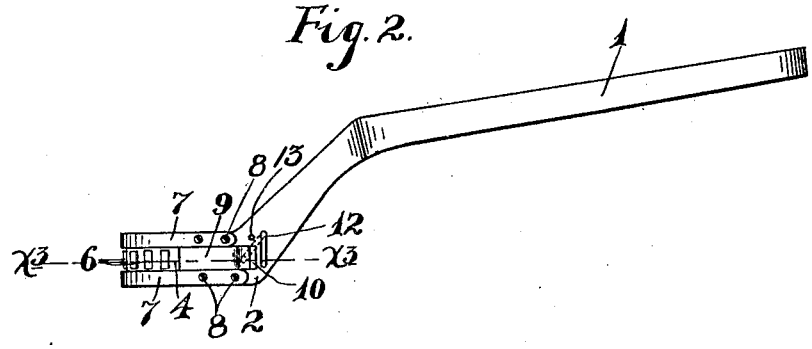
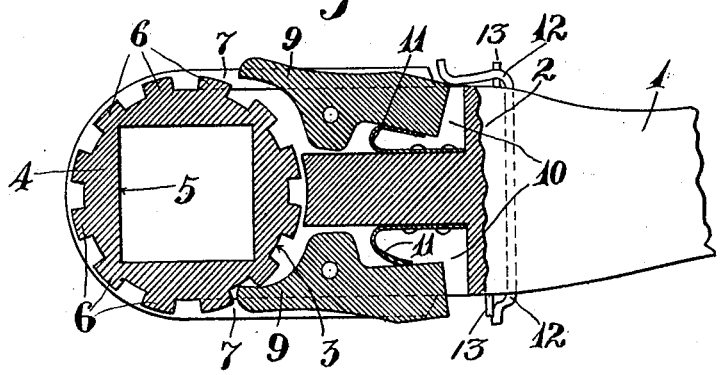
Witnesses.
Harry Opsahl.
L. L. Simpson.
Inventors.
Henry Haldorsen.
Kristofer H. Seem.
By their Attorneys
Williamson Merchant

UNITED STATES PATENT OFFICE.

HENRY HALDORSEN, OF OSCAR TOWNSHIP, OTTERTAIL COUNTY, AND KRISTOFER H. SEEM, OF ELIZABETH, MINNESOTA.

WRENCH.

No. 904,257.  Specification of Letters Patent.  Patented Nov. 17, 1908.

Application filed May 1, 1908. Serial No. 430,340.

*To all whom it may concern:*

Be it known that we, HENRY HALDORSEN and KRISTOFER H. SEEM, citizens of the United States, residing, respectively, in the township of Oscar and at Elizabeth, in the county of Ottertail and State of Minnesota, have invented certain new and useful Improvements in Wrenches; and we do hereby declare the following to be a full, clear, and exact description of the invention, such as will enable others skilled in the art to which it appertains to make and use the same.

Our invention has for its object to provide an improved wrench; and, to this end, it consists of the novel devices and combinations of devices hereinafter described and defined in the claim.

The invention is illustrated in the accompanying drawings, wherein like characters indicate like parts throughout the several views.

Referring to the drawings; Figure 1 is a plan view of the improved wrench. Fig. 2 is a side elevation of the same; and Fig. 3 is a view on an enlarged scale, principally in horizontal section, taken on the line $x^3$ $x^3$ of Fig. 1, but with some parts broken away.

The numeral 1 indicates an operating lever which is preferably crooked in one direction, as shown in Fig. 1, and crooked in another direction, as shown in Fig. 2, in order to more easily work between the bars of the concave and cylinder to reach the nuts located in the interior. The short end of the lever 1 is in the form of a bifurcated head 2. The outer ends of the prongs of the bifurcated head 2 are formed semi-cylindrical to afford half-seats 3 for the rotary hub 4, the said hub having a nut socket 5 and square teeth 6. U-shaped and laterally spaced retaining straps 7 embrace the hub 4 on either side of its teeth 6 and are detachably secured to the bifurcated head 2, preferably by long screw bolts 8. The teeth 6 are of such width as to freely work between the retaining straps 7 and the inner surfaces of the prongs of the bifurcated head 2 and serve to hold the hub 4 against endwise movement.

For coöperation with the teeth 6 on the hub 4, reversely acting dogs 9 are pivotally mounted in seats 10 afforded by the bifurcated head 2. The dogs 9 are subject to springs 11 which tend to press the said dogs into engagement with the teeth 6.

A dog shifting device for holding the dogs 9 out of engagement with the teeth 6, in alternate order, is in the form of a double-ended crank rod 12 having its intermediate portion mounted in the bifurcated head 2 and its crank ends projecting on either side of said head and extending at an angle of about ninety degrees to each other. The extreme outer ends of the said crank ends are bent to afford finger pieces for operating the crank rod 12. Stop pins 13 project from either side of the bifurcated head 2 in the path of the crank ends to allow only a slight rotary movement of the crank rod 12 sufficient to bring the crank ends of said rod into and out of engagement with the dogs 9.

By simply moving the crank ends into and out of engagement with the dogs 9, the direction of travel of the nut socket 5 may be readily changed.

The above device, while extremely simple and of small cost, is efficient for the purpose had in view.

What we claim is:

In a wrench, the combination with a lever, of a toothed hub mounted in said lever and having a nut socket, reversely acting spring pressed dogs intermediately pivoted to said lever for action on the toothed hub, and a dog shifting device, in the form of a double ended crank rod, with its intermediate portion mounted in said lever and extending transversely of the pivots of said dogs, and with its crank set at an angle to each other, and operative on the tails of said dogs in alternate order, substantially as described.

In testimony whereof we affix our signatures in presence of two witnesses.

HENRY HALDORSEN.
KRISTOFER H. SEEM.

Witnesses:
F. E. HANNEMAN,
W. S. LEE.